United States Patent
Freund et al.

(10) Patent No.: US 6,716,097 B2
(45) Date of Patent: Apr. 6, 2004

(54) DEVICE FOR SEVERING A SPARE RIB

(75) Inventors: Robert Freund, Borchen (DE); Reinhard Freund, Paderborn (DE); Hermann Hahn, Paderborn (DE); Maciej Zelichowski, Rheda-Wiedenbrück (DE); Manfred Syré, Paderborn (DE)

(73) Assignee: Freund Maschinenfabrik GmbH & Co. KG, Paderborn (DE)

( * ) Notice: Subject to any disclaimer, the term of this patent is extended or adjusted under 35 U.S.C. 154(b) by 0 days.

(21) Appl. No.: 10/344,524
(22) PCT Filed: Mar. 27, 2002
(86) PCT No.: PCT/EP02/03470
§ 371 (c)(1), (2), (4) Date: Feb. 12, 2003
(87) PCT Pub. No.: WO02/078452
PCT Pub. Date: Oct. 10, 2002

(65) Prior Publication Data
US 2003/0176158 A1 Sep. 18, 2003

(30) Foreign Application Priority Data
Mar. 30, 2001 (DE) .......................... 101 16 009

(51) Int. Cl.[7] ................................ A22B 5/20
(52) U.S. Cl. ...................... 452/149; 452/159; 452/170; 452/153
(58) Field of Search .............................. 452/149, 160, 452/150, 170, 153

(56) References Cited

U.S. PATENT DOCUMENTS

| 3,849,836 A | * | 11/1974 | Bernard et al. ............. 452/157 |
| 4,868,951 A | * | 9/1989 | Akesson et al. ............ 452/155 |
| 5,037,349 A | * | 8/1991 | Perreault .................... 452/152 |
| 5,611,727 A | * | 3/1997 | Dufour et al. .............. 452/153 |

* cited by examiner

Primary Examiner—Charles T. Jordan
Assistant Examiner—Judith A. Nelson
(74) Attorney, Agent, or Firm—Browdy and Neimark

(57) ABSTRACT

The invention relates to a device for severing a spare rib (RR) from a backbone (R), whereby the split backbone is conveyed inside a guideway (2), which is comprised of two guide plates (21, 22) and which delimits a wedge-shaped channel (23) through which the spare rib (R) projects each time and a cutting edge (10) of a cutting device (1) traverses past on the side of the rib. The cutting device (1) is a rotary blade with a cutting rim (10), which is tapered to form a sharp edge, and its cutting blade (11) is arranged nearly parallel to the guide plates (21, 22) whose distance from one another can be adjusted.

21 Claims, 7 Drawing Sheets

DEVICE FOR SEVERING A SPARE RIB

The present invention is concerned with a device for severing a sparerib from a backbone, wherein the split backbone is conveyed inside a guideway, which is comprised of two guide plates and which delimits a wedge-shaped channel through which the sparerib projects in each case and a cutting device traverses past on the side of the ribs.

A cutting device of this type is known from CA 2,010,034, wherein a band saw crosses the path of conveyance of the sparerib. The band saw, as is well known, produces a wide cut of approximately 0.8 mm and, hence, high losses on the valuable spareribs. The waste material must be disposed of in a complex manner in accordance with the regulations. Also, in the above known device the spacing cannot be varied between the two steep-angled guide surfaces that are located at the input end of the saw. In these, the backbone with the ribs is held in such a way that the ribs are located in between and the backbone above them, thus defining the cutting plane of the saw in relation to the backbone. As a result, in the case of a thicker backbone, the cut is unnecessarily far away from it and a considerable amount of sparerib is lost. The band saw has the added shortcoming that it incorporates multiple moving parts, which require complex cleaning and maintenance.

It is the object of the invention to create a cutting device for spareribs that does not have the above shortcomings and results in minimal waste and losses while providing a simple design and safe operation.

This object is met in such a way that the cutting tool is a circular blade with a slicing or serrated edge, which is tapered to form a sharp edge and which is disposed close and parallel to the guide plates, whose distance from one another can be adjusted.

Advantageous embodiments will be specified in the subclaims.

The blade with its wedge-shaped finish, as compared to a band saw, operates as a rotating cutting blade, which pushes the separated areas apart without removing much material from the cut like a saw. The cutting losses are thus very minimal when a small serration is provided along the edge and next to zero when a smooth or slightly wave-shaped cutting edge is implemented.

The adjustability of the width of the guide channel because of the adjustability of one guide plate in relation to the other results in each case in an optimal position of the backbone in the channel that matches its thickness. In this manner the cut is performed close to the vertebrae in each case, and it prevents cutting into the side processes that extend from the vertebrae next to the ribs by a close margin, but no piece of the sparerib is lost.

The exact depth position of the backbone in the guide channel is ensured by a conveyor drive that exerts an elastic pressure and comprises a plurality of contact pressure wheels that are driven synchronously and can optionally be coupled, and which are held elastically in the direction toward the split surface of the backbone. The contact pressure wheels, of which there are preferably three, are positioned along the channel in such a way that at least one of them acts upon the backbone before the ribs enter into the cutting position, and at least one of them acts upon the backbone after it leaves the cutting area.

The conveyor belt with its guide plates starts in front of the conveyor wheels with a covered safety area and with an insertion area in front of the former, where the backbone with the attached ribs is placed, inserted, into the channel.

To render the insertion simple, the guide and support plates are positioned horizontally and the circular cutting blade is disposed horizontally below it.

In an advantageous embodiment the cutting blade enters with its edge into a groove in the guide plate so that the cutting blade together with the closely adjacent groove leg performs a shearing function. The circumference speed of the blade is only approximately 5 times greater than the conveyance speed and thus considerably slower than that of a saw.

What remains on a backbone after the tenderloin has been cut out are the curved true ribs, of which 100 to 150 mm for the formation of the spareribs are left on the backbone to be severed in each case, and adjoining the same is an area with false ribs, which are shorter and virtually not curved. Between the individual true and false ribs extends the valuable residual meat, which is to be rendered useable by the severing cut. In a preferred method, incisions are made into the residual meat in the transition area between the types of ribs and the backbone is then placed into the cutting device. The difference in length between the curved and straight ribs is utilized advantageously to separate the two rib sections after they have been severed in such a way that a separating wall is disposed at an appropriate height in the drop region for the rib sections. The deflector unit that is formed in this manner guides the curved wide spareribs and the narrow, shorter side pieces into different collection containers.

In an advantageous improvement of the invention, a conveyor belt with a drive that transports the spareribs to a processing table is disposed in the end region behind the cutting device in lieu of a slide. The belt conveyor and its protection cover are advantageously mounted height adjustable on the stand of the cutting device in an easily removable manner, to permit an effortless cleaning.

In a further advantageous embodiment, severing shears are provided in the front inlet area to cut off the relatively small flap with the false ribs so that the cutting disk is used only to sever the real ribs. This eliminates the separation in the rear conveyance area. The severing shears are controlled with optical sensors that are adjusted to the transition area between the short and long ribs.

Advantageous embodiments are shown in FIGS. 1–8.

Figure 7:
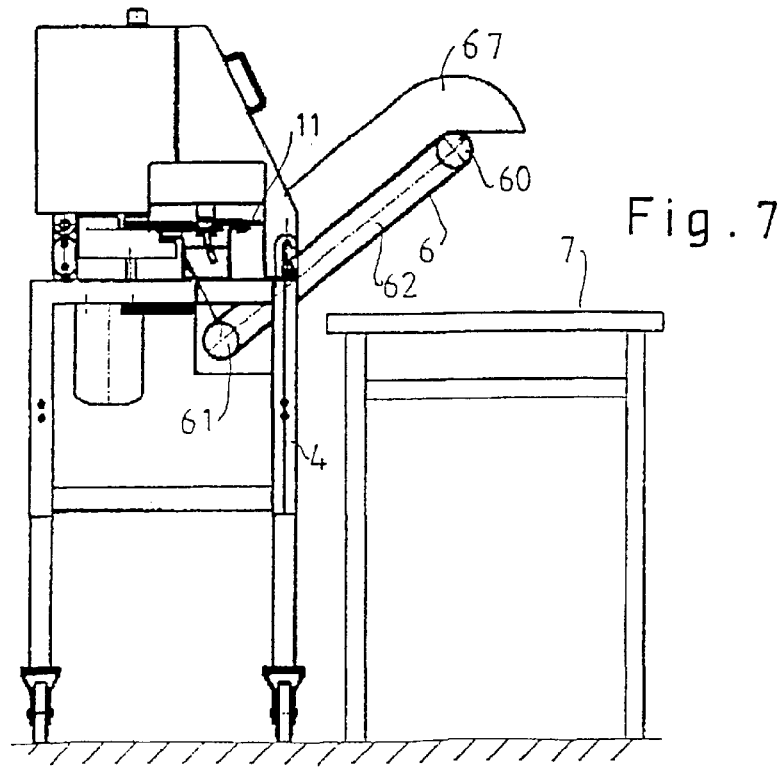
Figure 8:
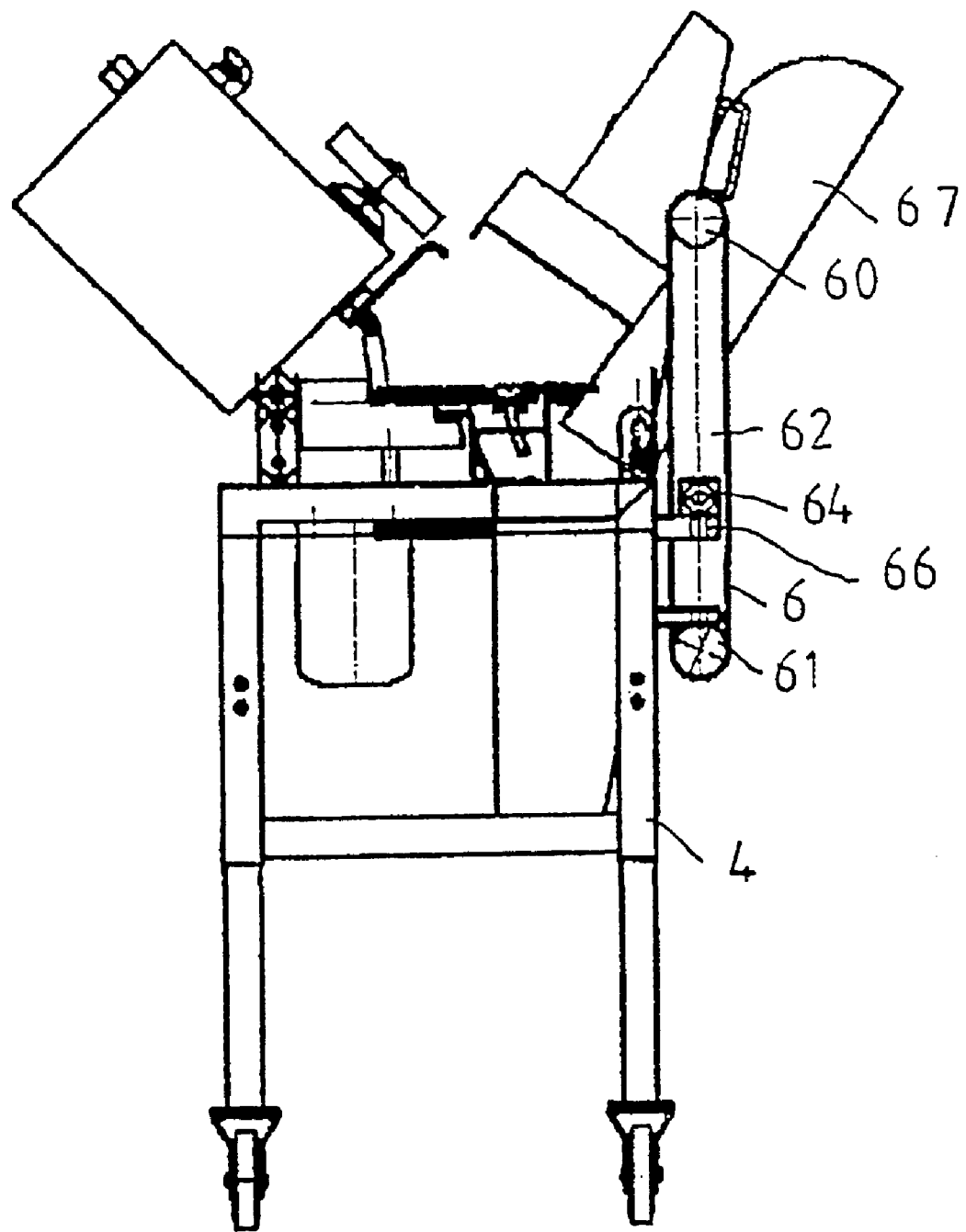

[1] Translator's note: The German-language sentence on which this translation is based appears to be missing a word FIG. 7 shows the conveyor belt in a side elevational view;

FIG. 8 shows the side elevational view with swiveled up coverings and conveyor belt.

Figure 1:
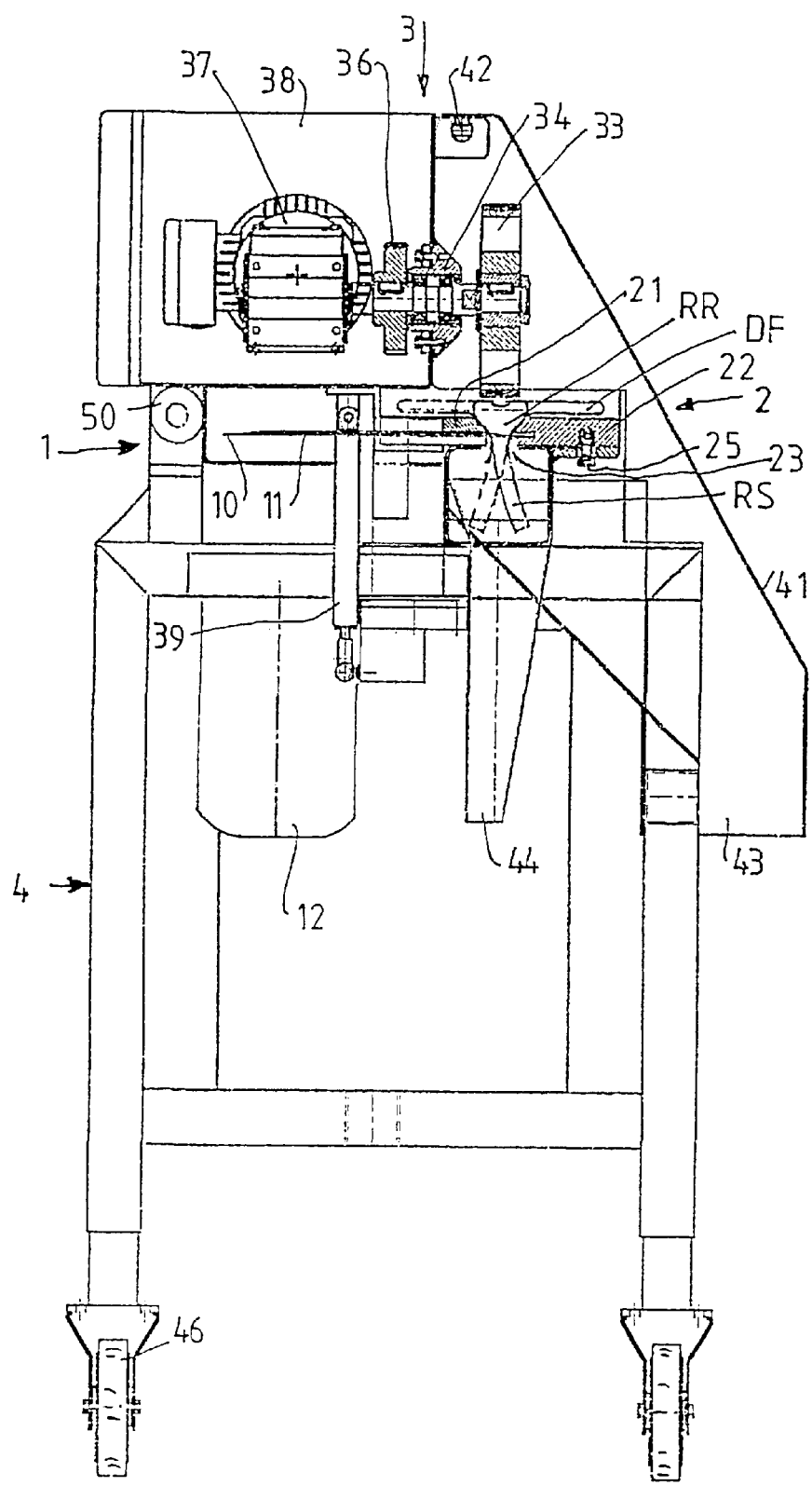
FIG. 1 shows a front elevational view of the device with see-through covering.

FIG. 1 shows the device, which is mounted on a stand 4 with wheels 46, in a depiction with the covering 38, 41 shown as see-through. Mounted in the stand 4 is a circular cutting device 1 with a vertical axis of rotation. The geared motor 12 carries on its driving axle the circular cutting blade 11, which has a toothed rim 10 or preferably a tooth-free shearing edge on its tapered edge region.

The cutting blade 11 extends to below a guideway 2, which is designed as a guide channel 23 between two guide plates 21, 22 and executed narrowing towards the bottom.

This design permits the insertion of the split backbone RR longitudinally, with the spiny processes DF facing to the side and leaving the sparerib RS projecting toward the bottom so that the cutting blade 11 severs the ribs closely beneath the vertebrae.

The guide plate 22 that is situated on the outside incorporates a cutting rim receiving groove 24 in the longitudinal direction. The guide plate 22 slides in cross guides 26 and can be locked with locking means 25 in the stand 4, thus rendering the gap width of the guide channel 23 easily adjustable to the vertebrae size of the animal carcasses being processed.

Removal funnels 43, 44 are disposed below the guideway 2, through which the wider sparerib RS and the narrower side piece, which contains the shorter false ribs, are carried off separately.

A conveyor drive 3 is disposed above the guideway 2. It acts upon the split side of the backbone with a series of conveyor wheels 33 and transports the same into the cutting station and out of it. The conveyor wheels 33 are provided with elastic webs, and/or they are supported with a limited mobility relative to one another in pendulum-type supports 34 or with a flexible coupling, and driven in a synchronized manner via gearwheels 36 by the conveyor motor 37.

The drive assembly of the conveyor 3 is supported pivoting in a pivot bearing 50 on the stand 4 and encased by the conveyor drive housing 38. The conveyor wheels and the cutting area are encased by a protection hood 41, which is disposed removable and pivoting on the conveyor drive housing 38 by means of a suspension-type connector 42.

Figure 2:
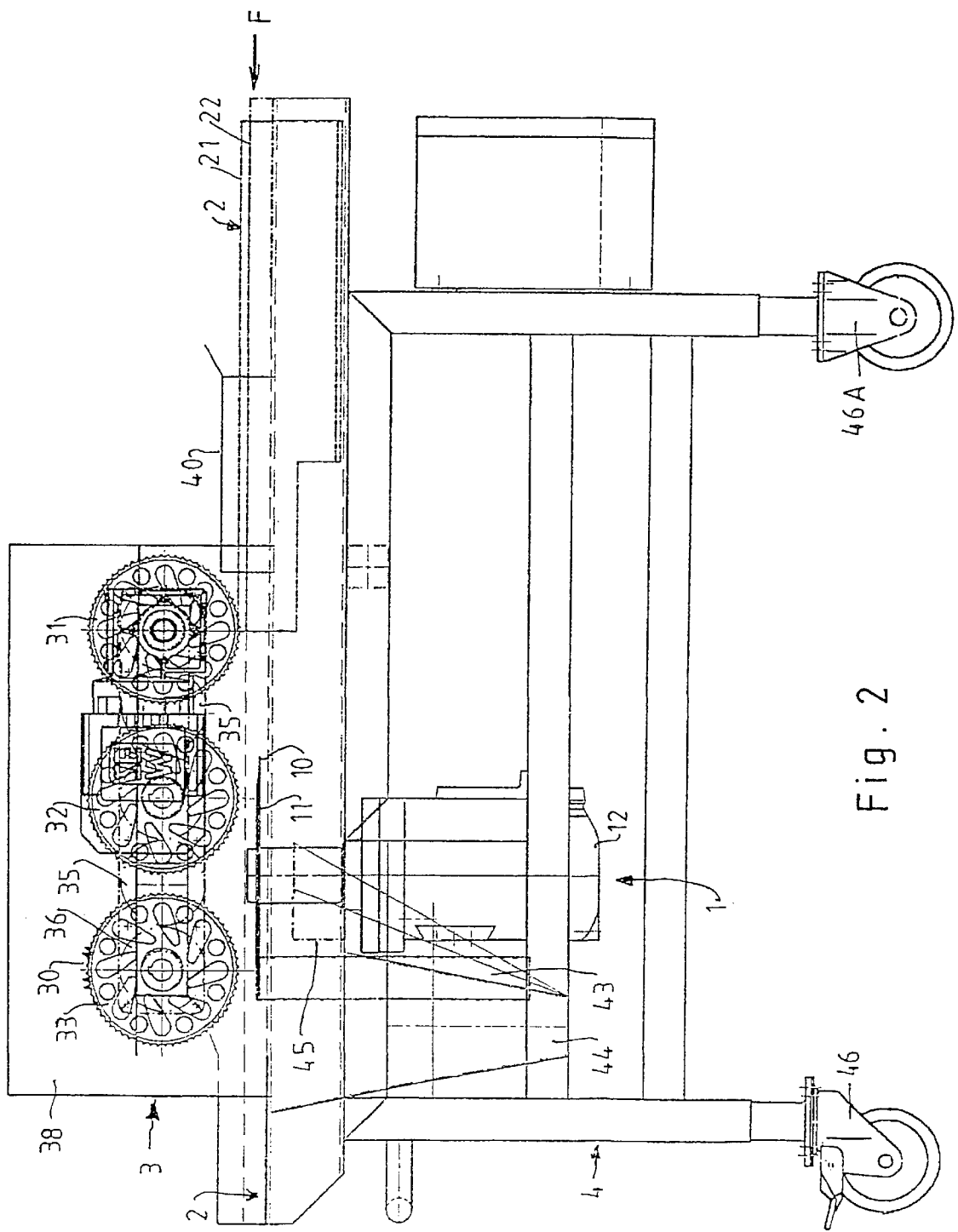
FIG. 2 shows a see-through side elevational view.

FIG. 2 shows a side elevational view with a covering 38 that is drawn as see-through. The stand 4 has two longitudinal rollers 46A and two swivel-mounted lockable rollers so that it is easy to transport and stands securely when in use. The guideway 2 is disposed at a good operating height. The guideway 2 is open on top, shown on the right in the figure, where the pieces that are being processed are entered. Adjoining the same, in the direction of conveyance F, is a conveyance area with a safety cover 40, and the conveyance area is adjoined by the conveyor drive 3, which is covered with the forward drive housing 38 and the protection hood, which is not shown. A protection hood is also provided on the output side of the former.

In the conveyance area, conveyor wheels 31–33, for example three of them, are disposed behind one another in the direction of conveyance F at the height of the vertebrae being conveyed and acting upon the same with a contact pressure force, said conveyor wheels having actuating cams 30 distributed along their circumference. Behind the side of the conveyor drive 3 that is drawn as see-through, gearwheels 36 are disposed coaxial to the conveyor wheels 31–33, and intermediate wheels 35 are located between the gearwheels 36 that distribute the drive force between the wheels 36 and synchronize the same.

The cutting area of the cutting rim 10 of the cutting blade 11 is located above the geared motor 12 of the cutting device 1 in the direction of conveyance F between the second and third conveyor wheel 32, 33, so that a reliable transportation to and from the cutting area is ensured. The toothed rim 10 preferably has a somewhat higher speed in the advancing direction than the conveyor wheels 31–33 on their circumference, so that the cut is made in a pulling fashion.

The severed sparerib is guided by the deflector 45 into a funnel 43 and the smaller side piece is guided via the deflector 45 into the removal funnel 44. The remaining backbone leaves the device at the end of the conveyor belt.

In an additional embodiment of the device, which is not shown, the deflector 45 is electromagnetically height-adjustable. A light barrier or a sensor in the forward drive area in front of the saw 1 controls the magnet.

Figure 3:
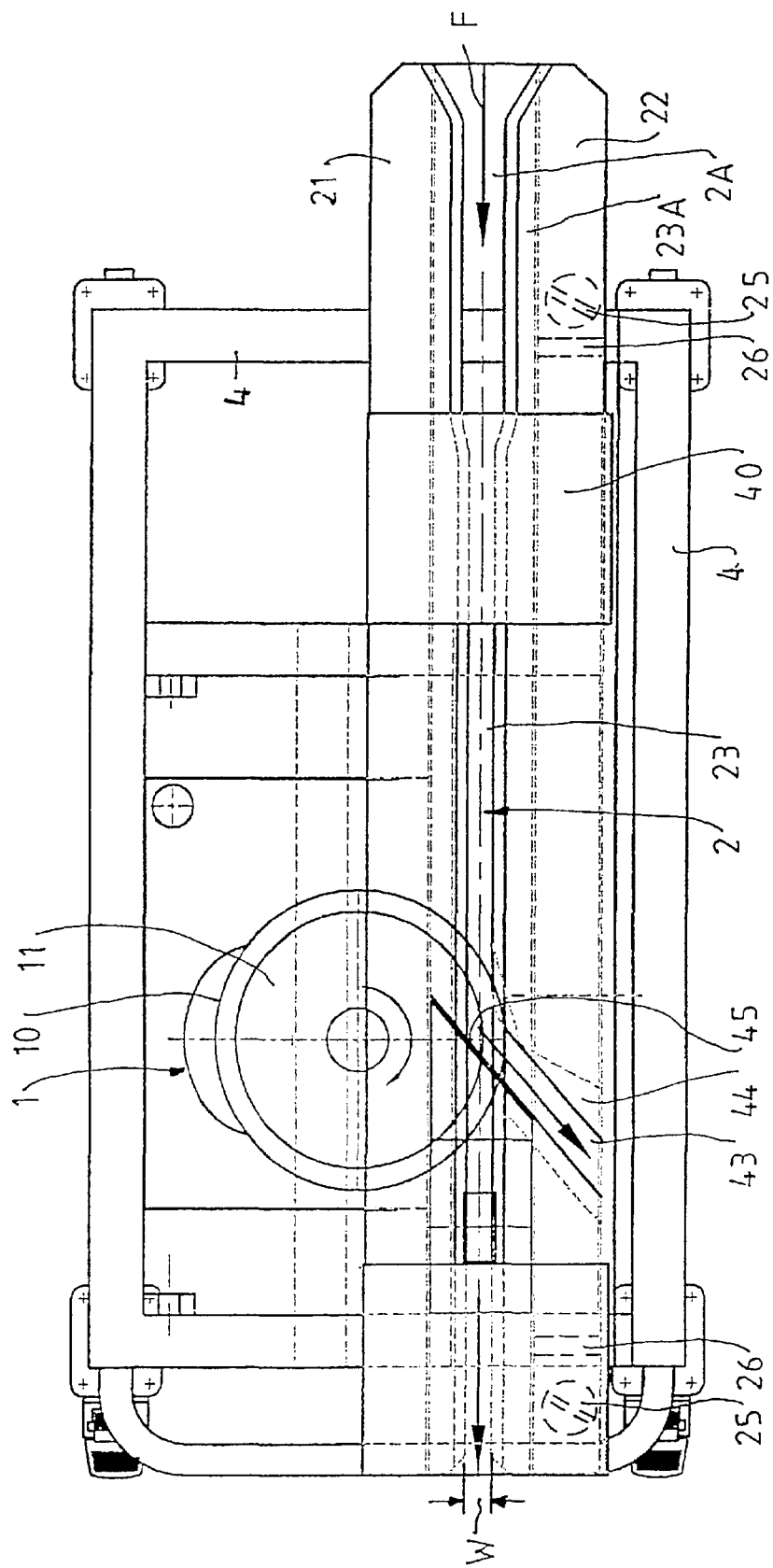
FIG. 3 shows a top view with the forward drive assembly removed.

FIG. 3 shows a top view of the device with the conveyor device removed. The guideway 2, 2A is funnel shaped on the inlet side and executed a little wider in the intake area 23A than in the conveying and cutting area to facilitate insertion of the spareribs.

The two guide plates 21, 22 incorporate beveled edges that widen the guide channel 23 toward the top. The outer second guide plate 22 is supported on its stand-supported end in parallel cross guides 26 on the stand 4 and can be locked with easy to operate locking means 25 whenever the gap width W of the guide channel 23 has been adjusted to a desired size.

Also visible in the figure, next to the cutting area, are the funnels 43, 44 that branch off diagonally slanted at an obtuse angle in the direction of conveyance F.

Figure 4:
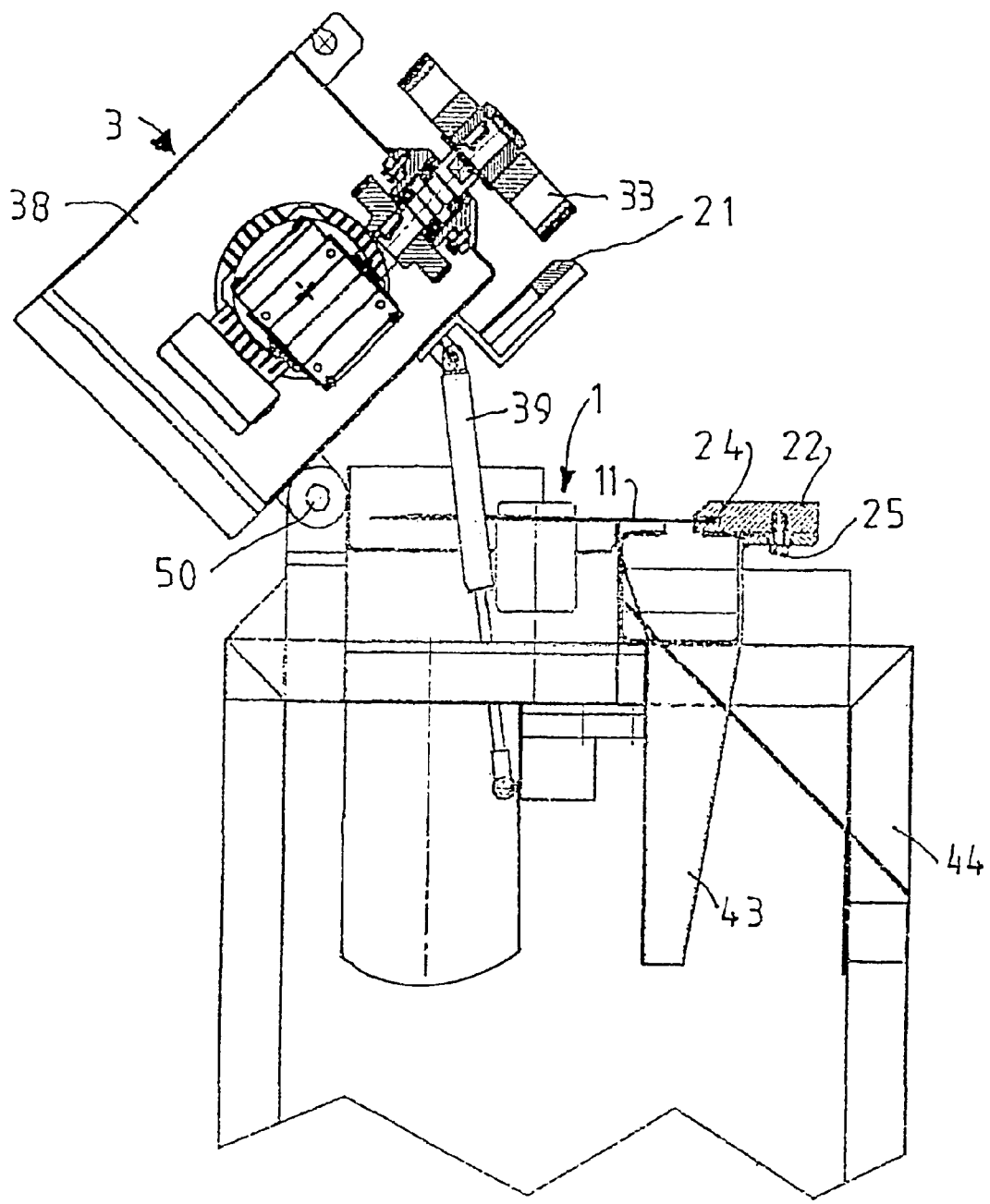
FIG. 4 shows a front elevational view with the forward drive assembly swiveled up.

FIG. 4 shows a section of FIG. 1 in the cleaning or maintenance condition of the device. The protection hood and safety cover are completely removed and the conveyor drive 3 is swiveled up around the pivot supports 50 by approximately 45°. A gas spring 39 supports the same in the process. Along with the conveyor drive 3, the first inner guide plate 21 is also swiveled up in the conveyance area. The second guide plate 22 can be pulled forward and/or lifted off after releasing the locking means 25, so that the groove 24, which receives the cutting rim 10 of the cutting blade 11 adjacent to the cutting area, can be easily cleaned and the cutting blade 11 can be removed and optionally exchanged.

The entire device, to the extent that is exposed to foodstuffs and cleaning agents, is composed of stainless steel or plastic that is authorized for use in the food industry.

Figure 5:
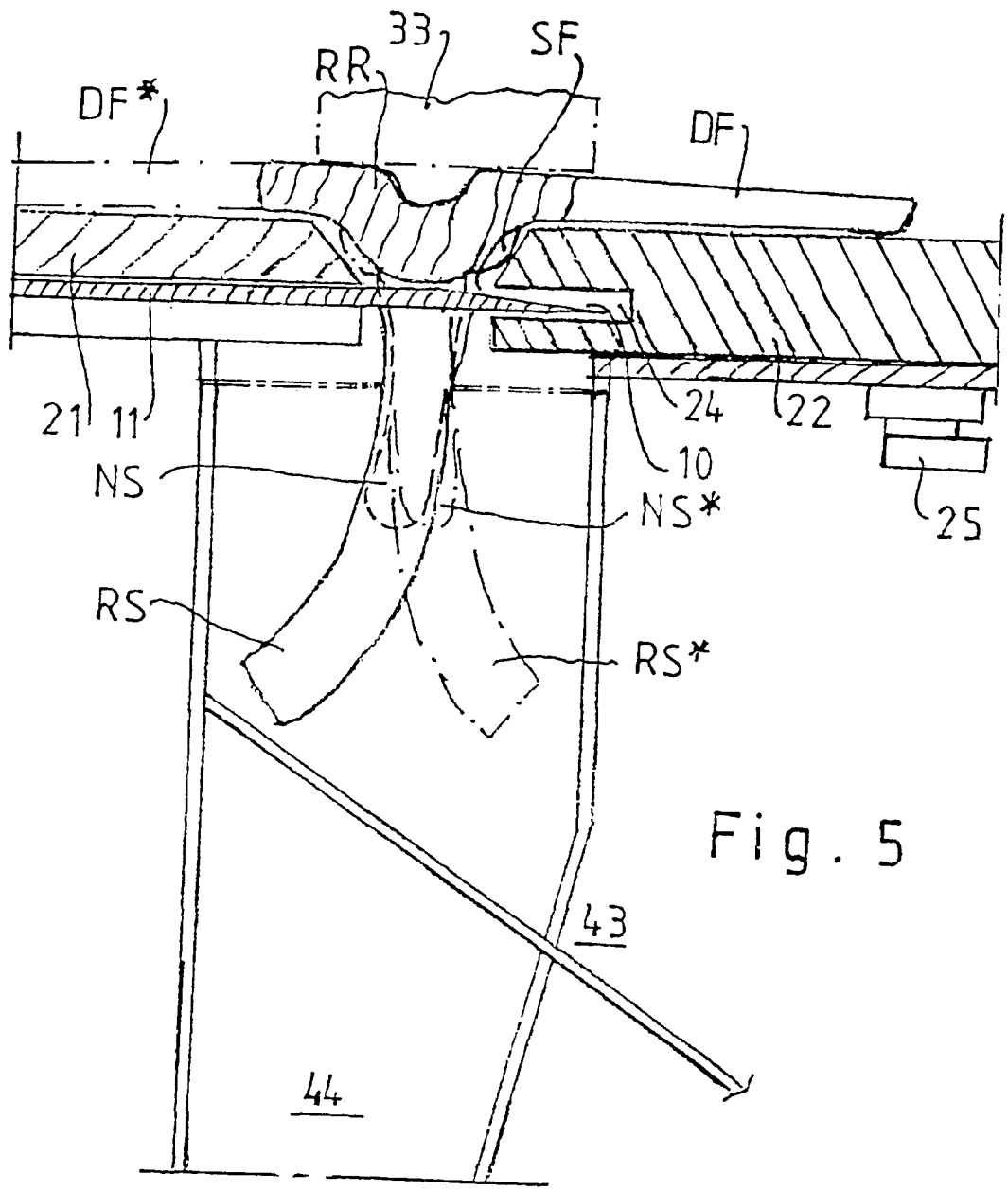
FIG. 5 shows a detail of FIG. 1.

FIG. 5 shows an enlargement of the cutting area from FIG. 1. The guideway is executed between the guide plates 21, 22 as a wedge-shaped groove 23 that is tapered at its bottom. Rotating horizontally below the same is the cutting blade 11 with its cutting rim 10 that is tapered along its edge and produces a splitting cutting effect. The tapered cutting blade area extends beyond the slot 23 of the guideway into a receiving groove 24 of the outer second guide plate 22, which is removably fixed on the stand by means of the locking means 25.

The backbone RR lies with its split side facing up and rests with the halves of the spiny processes DF, DF* on one of the guide plates 22, 21. The parts of the given right half of the carcass have been marked with an asterisk by the reference numeral and are drawn in a dashed line. The popular sparerib RS, RS* projects through the guide slot by approximately 10 cm. The severing cut extends immediately below the small side processes SF of the vertebrae when the width of the guide slot has been adjusted to match the vertebrae size of the type of animal. The narrower side pieces NS, NS*, which contain the false short ribs, are also severed from the vertebrae members without major losses. The conveyor speed of the conveyor wheels 33 is approximately 1 m/s.

Added to the above described advantages is the fact that the sheared-off end product looks better than one that has been produced with a band saw, due to a clean surface, and contains a comparably lesser number of germs and, hence, has a longer shelf life. There is no smearing caused by sawdust on the meat surface or on the cutting blade. Bone splinters also do not form. The phase of the cutting blade is oriented upward and the smooth side is oriented toward the useable pieces, the spareribs. Minor amounts of crumbs that form in the upper region on the cutting blade are wiped off and do not smear the cutting blade. Deposits that would form a breeding ground for microbes and, hence, cause a problem of hygiene, thus do not form.

Figure 6:
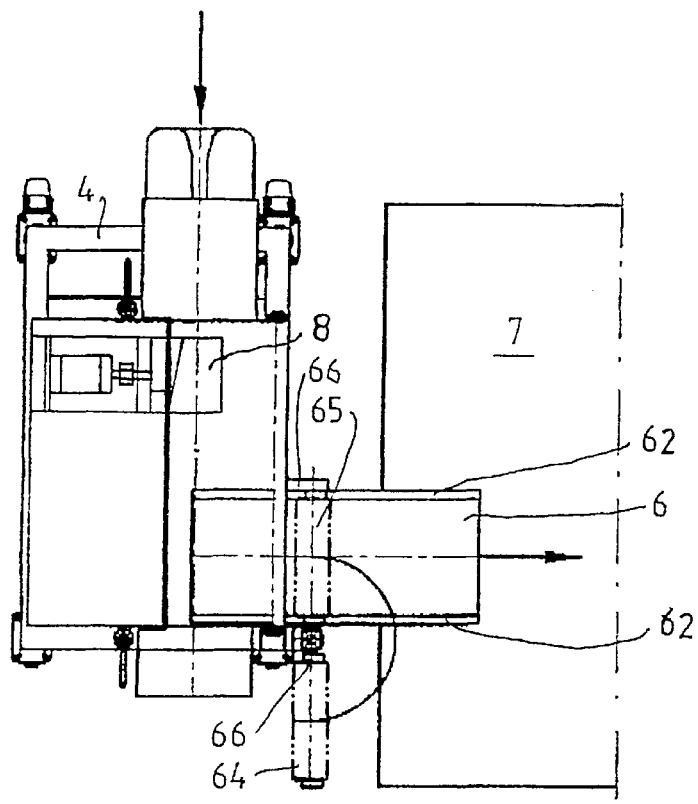
FIG. 6 shows a conveyor belt addition with removed[1] in a top view.

FIG. 6 shows an additional embodiment of the device, wherein a conveyor belt 6 is disposed on the output side of the cutting blade 11 below the same, in lieu of a slide with the collection container. The conveyor belt 6 is guided around two deflection rollers 60, 61, which are supported in a frame 62. The motor 64 serves to drive the belt 6 via a drive roller 65, as shown in FIG. 6 with the cover removed.

The frame 62 is held pivoting and easily removable on the stand 4 in holders 66. It can thus be moved into a vertical position as in FIGS. 7 and 8 to provide access for cleaning, and placed into a slanted or horizontal position, depending on the height of the processing table 7 onto which the spareribs are to be conveyed. A cover 67, which is also mounted on the frame 4 in a manner so that it can be swiveled up and removed, as shown in FIG. 8, is provided for protection above the conveyance area of the belt 6.

All coverings and conveyor means are provided in their operating position with locking means and/or contacts, which are switched in a manner so that an operation is possible only in a completely safe ready-mode.

In a further embodiment phase, as shown dashed in FIG. 6, severing shears 8 are disposed below the input area, which are controlled by sensors and which close when the short flap, i.e., the side piece is located in the shearing area.

The conveyor wheel on the input end is preferably driven in a controllable, coupled manner and is uncoupled by the sensors in each case when the severing shears 8 are being actuated.

LIST OF REFERENCE NUMERALS

1 Cutting Device
10 Cutting Rim
11 Cutting Blade
12 Geared Motor
2, 2A Guideway
21 First Guide Plate
22 Second Guide Plate
23 Guide Channel
23A Inlet Area
24 Cutting Rim Receiving Groove
25 Locking Means for 22
26 Cross Guides
3 Conveyor Drive
30 Actuating Cams
31–33 Conveyor Wheels
34 Pendulum-Type Support
35 Intermediate Wheels
36 Gearwheels
37 Conveyor Motor
38 Forward Drive Housing
39 Gas Spring
4 Stand
40 Safety Cover
41 Protecting Hood
42 Suspension-Type Connector for 41
43 Removal Funnel for RS
44 Removal Funnel for NS
45 Deflector
46, 46A Rollers
50 Pivoting Support for 3
6 Conveyor Belt
60, 61 Deflector Rollers
62 Frame
64 Motor
65 Drive Roller
66 Belt Frame Holder
67 Protection Cover
7 Processing Table
8 Severing Shears
DF Spiny Processes
DF* Spiny Processes (right)
F Direction of Conveyance
NS Side Piece
NS* Side Piece (right)
RR Backbone
RS Sparerib
RS* Sparerib (right)
SF Side Processes
W Gap Width

What is claimed is:

1. A device for severing a sparerib (R) from a backbone (RR), wherein the split backbone is conveyed inside a guideway (2), which is comprised of two guide plates (21, 22) and which delimits a wedge-shaped channel (23) through which the sparerib (R) projects in each case and a blade ($1^1$) of a cutting device (1) traverses past on the side of the ribs, characterized in that the cutting device (1) is a circular blade with a wedge-shaped sharp-edged cutting rim (10), the cutting blade (11) of which is disposed close and parallel to the guide plates (21, 22), whose distance from one another is adjustable.

2. A device according to claim 1, characterized in that the cutting blade (11) is disposed essentially horizontally.

3. A device according to claim 1, characterized in that the cutting rim (10) extends to below or into the guide plate (22) that is located away from the cutting device (1).

4. A device according to claim 1, characterized in that the guide channel (23, 23A) has, in a direction of conveyance (F), a funnel-shaped beginning area and an insertion and inlet area (23A) that is somewhat wider and open on the top as an adjoining conveying and cutting area.

5. A device according to claim 4, characterized in that the guide channel (23) is designed tapered toward the bottom and its width (W) can be adjusted in each case in such a way that the backbone (RR) with its vertebrae and side processes (SF), when placed in the guide channel (23) are flush with the cutting blade (11).

6. A device according to claim 1, characterized in that a conveyor drive (3) is disposed above a conveyor belt (6) in such a way that it places a contact force onto the split surface of the backbone (RR) and acts upon the same in the direction of conveyance (F) in front of a sawing area, as well as in and behind a sawing area, and transports it out from the end of the guideway (2).

7. A device according to claim 6, characterized in that the conveyor drive (3) consists of a plurality of pimpled conveyor wheels (31–33) that either incorporate elastic webs or are supported with a limited vertical movement in pendulum-type supports (34) or with an elastic coupling and which are driven synchronously.

8. A device according to claim 7, characterized in that the drive axles of the conveyor wheels (31–33) are connected to one another in terms of a drive via gearwheels (36) and intermediate wheels (35).

9. A device according to claim 8, characterized in that the conveyor drive (3) together with its conveyor motor (37) is disposed as a pivoting assembly on a stand (4), which carries the circular cutting blade (11).

10. A device according to claim 9, characterized in that the pivoting assembly of the conveyor drive (3) is supported on the stand (4) by means of a gas pressure spring (39) and the inside guide plate (21) carries at least the section of it that is located in the conveyance area.

11. A device according to claim 9, characterized in that the conveyor drive (3) is encompassed by a conveyor housing (38) on which a protection hood (41) for the sawing and conveyance area is suspended in a manner so that it can be swiveled up and removed.

12. A device according to claim 11, characterized in that the guide channel (23) is covered between the insertion area (23A) and protection hood (41) with a safety cover (40) that has a matching free area for the given inserted backbone (RR).

13. A device according to claim 6, characterized in that, in the direction of conveyance (F) adjoining the sawing area, a deflector (45) is disposed at a distance below the guide channel (23) in such a way that a sawed off sparerib (RS, RS*) falls off the same into a first removal funnel (43) and a shorter side piece (NS, NS*) falls into a second removal funnel (44) that is located behind the former.

14. A device according to claim 9, characterized in that the stand (4) sits on rigidly aligned wheels (46) and on swivel-mounted lockable wheels (46A).

15. A device according to claim 1, characterized in that the conveyor drive (3) conveys at a speed somewhat below the circumference speed of the circular blade (11).

16. A device according to claim 13, characterized in that the deflector (45) is height adjustable by electromagnetic control through a sensor in the conveyance area in front of the sawing area at the height of the ends of the side pieces (NS).

17. A device according to claim 13, characterized in that on the output side of the disk type cutting blade (11) a motor-driven conveyor belt (6) is disposed below the former, which transports the severed spareribs (RS) laterally out of the stand (4).

18. A device according to claim 17, characterized in that the conveyor belt (6) is supported deflected by rollers (60, 61) in a frame (66) that is held on the stand (4) with an adjustable inclination and removable, so that it can be moved vertically into a transportation and cleaning position and into a horizontal or inclined operating position.

19. A device according to claim 17, characterized in that the conveyor belt (6) is encased with a protection cover (67), which is held pivoting and removable on the stand (4).

20. A device according to claim 1, characterized in that motor-driven shears (8) are disposed in an inlet area in front of the disk type cutting blade (11) below the guide plates (21, 22), which is controlled by sensors to briefly close in each case when the side piece (NS), and only the side piece is located completely within its shearing zone.

21. A device according to claim 20, characterized in that the conveyor wheel on the inlet side is driven controllable and coupled and is decoupled by the sensors in each case when the cutting shears (8) are being actuated.

* * * * *